(12) United States Patent
Sakai

(10) Patent No.: US 7,347,321 B1
(45) Date of Patent: Mar. 25, 2008

(54) FLEXIBLE CONVEYOR RAIL

(76) Inventor: Hideyuki Sakai, 1-44, Okunagairi, Ohnishi-cho, Okazaki-shi, Aichi 444-0811 (JP)

( * ) Notice: Subject to any disclaimer, the term of this patent is extended or adjusted under 35 U.S.C. 154(b) by 0 days.

(21) Appl. No.: 09/650,625

(22) Filed: Aug. 30, 2000

(30) Foreign Application Priority Data

Aug. 31, 1999 (JP) .................................. 11-246316

(51) Int. Cl.
*B65G 41/00* (2006.01)
(52) U.S. Cl. .................................. 198/861.2; 198/678.1
(58) Field of Classification Search ............. 198/860.1, 198/861.1, 861.2, 861.5, 678.1
See application file for complete search history.

(56) References Cited

U.S. PATENT DOCUMENTS 4,154,336 A * 5/1979 Sorokin ....................... 198/862
5,033,605 A * 7/1991 Marquart .................. 198/861.1
5,101,734 A * 4/1992 Sakai ....................... 198/861.2
5,188,035 A * 2/1993 Sakai ....................... 198/861.2

* cited by examiner

*Primary Examiner*—James R. Bidwell
(74) *Attorney, Agent, or Firm*—Clark & Brody

(57) ABSTRACT

A flexible conveyor rail to be used as a part of a conveyor system such as a trolley conveyor system or a cross bar conveyor system wherein the flexible conveyor rail freely bents downwardly or upwardly within a predetermined range. The flexible conveyor rail is configured with a plurality of rail pieces arranged in a longitudinal direction of the flexible conveyor rail, a plurality of stopper pieces each being connected to a corresponding one of the rail pieces, a link chain for connecting each set of the rail piece and the stopper piece to other set of the rail piece and the stopper piece to be freely bent in a vertical direction. A link plate of the link chain is attached to a corresponding one of the rail pieces.

34 Claims, 10 Drawing Sheets

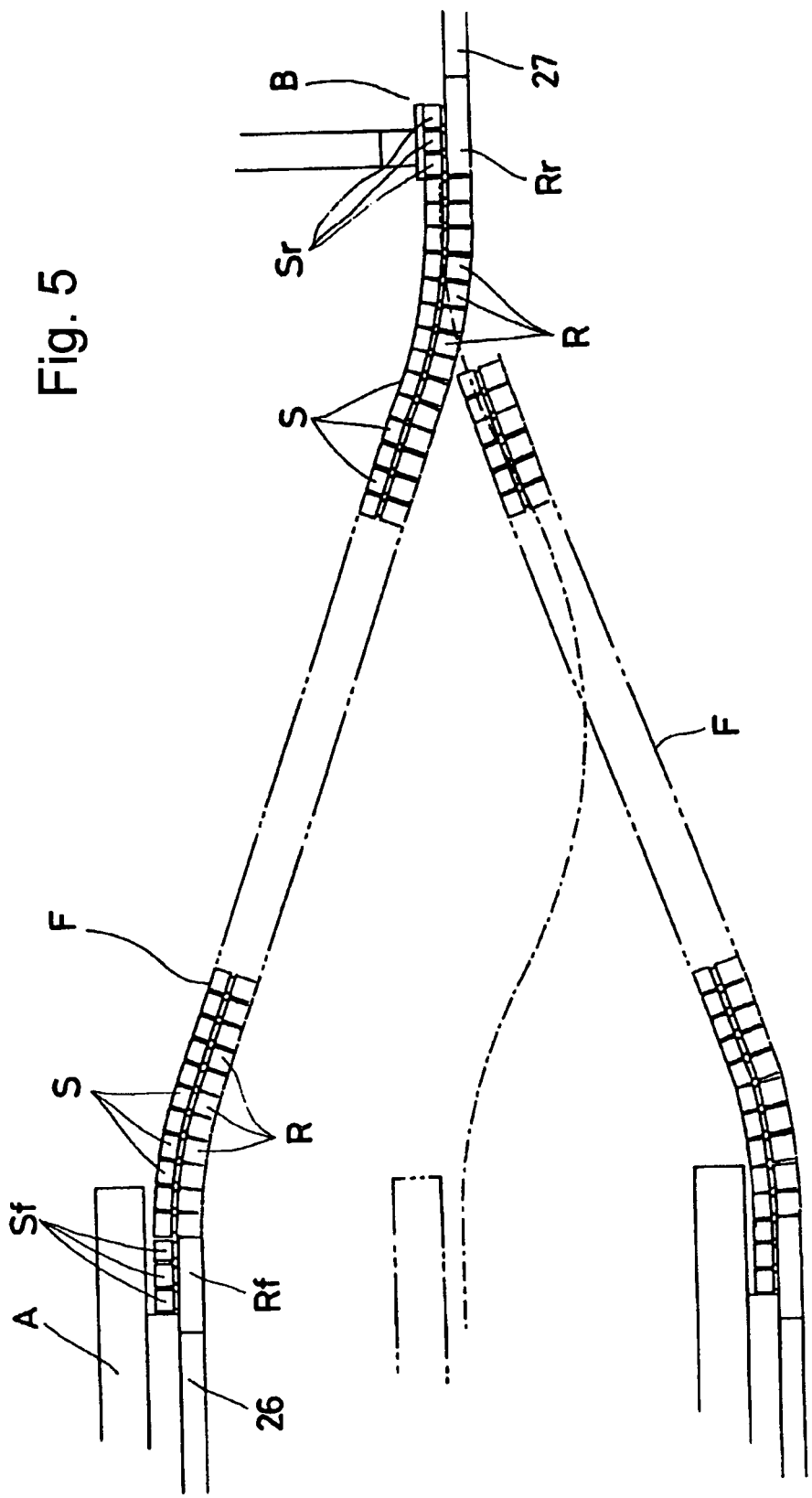

FLEXIBLE CONVEYOR RAIL

FIELD OF THE INVENTION

This invention relates to a flexible conveyor rail having a flexible link chain as a tension member, and more particularly, a flexible conveyor rail to be used as a part of a conveyor rail in a conveyor system such as a trolley conveyor system or a cross bar conveyor system wherein the flexible conveyor rail freely bents downwardly or upwardly within a predetermined range.

BACKGROUND OF THE INVENTION

The inventor of this invention has proposed various types of flexible conveyor rail having a part that can freely bend upwardly or downwardly in a conveyor system such as a trolley conveyor system, a cross conveyor system, or a pallet conveyor system. Such flexible conveyor rails are described in Japanese Patent Laid-Open Publication Nos. H3-50061, H4-128403, H4-64602, H4-64603, H4-235811, and H4-23518.

In the flexible conveyor rail shown in the Japanese Patent Laid-Open Publication No. H3-50061, rail pieces made by cutting a lip channel steel into short pieces are used. An example of such a flexible conveyor rail is shown in FIG. 10 in the patent publication and is applied to a trolley conveyor system. The flexible conveyor rail by this prior art has contributed to a relatively highly efficient electrodeposition coating system in which various types of works are transferred.

Further, by incorporating a plurality of flexible conveyor rails such as shown in Japanese Patent Laid-Open Publication No. H4-63297 into the electrodeposition coating system, the flexible conveyer rail in the conventional technology has contributed to improvements in the operation efficiency and labor savings.

In the aforementioned flexible conveyor rails, because each rail piece is produced from a lip channel steel, it is limited to convey relatively light weight works. For example, the maximum transfer capacity of the trolley conveyer is limited to around 75 kg per hanger. In the crossbar conveyor where two conveyer rails are arranged in parallel, the work transfer capacity of up to about 150 kg can be achieved.

Recently, there is increasing demand for transferring a middle weight works. Namely, the work transfer capacity of greater than 150 kg per hanger for a trolley conveyor having a single conveyor rail is desired. Moreover, if possible, the demand extends to transfer heavy weight works, i.e, the transfer capacity of 500-600 kg per hanger.

The inventor of this invention has proposed a flexible conveyor rail having a greater transfer capacity in the Japanese Patent Laid-Open. Publication No. 4-64602 and U.S. Pat. No. 5,101,734. In this flexible conveyor, rail pieces which have been produced by cutting an I-shaped steel into short pieces are used. In each rail piece, a channel piece is fixed to the top of an I-shaped piece. The opposite side plates are fixed to the respective side walls of the channel piece in a manner offset backwardly or forwardly. Each set of the I-shaped piece, the channel piece and the side plates is connected to the other set through connecting plates which are offset relative to the side plates backwardly or forwardly in a predetermined amount. The side plates and the connecting plates are pivotally connected with one another through pivotal bolts to form a flexible conveyor rail. The inventor has conducted various experiment on this flexible conveyor rail.

However, in the flexible conveyor rail described above, the self-weight is very heavy (for example, 1,800 kg to 2,000 kg for the length of 4 m) due to the structure. Moreover, looseness in the conveyor rail is unnecessarily large at the bent portions of the conveyor rail probably because the flexibility for the up-down bending is achieved solely by the construction wherein the end surfaces of adjacent components of the rail pieces contact with one another.

As a result, smooth bending operations in the work transfer tends to be hindered, or the smooth transfer of the works tends to be interfered. Thus, it has become apparent that the flexible conveyor rail using the I-shaped rail pieces and the channel pieces in the conventional technology has a structural problem.

In the flexible conveyor rail based on the rail pieces of lip channel steel type metal shown in the Laid-Open Publication No. H3-50061 described above, two or three hangers can be provided in about four (4) meter length of the flexible conveyer rail stationary or moving along the conveyor rail. However, in the flexible conveyor rail described above, in the Laid-Open Publication No. H4-65602, i.e., U.S. Pat. No. 5,101,734, at most one hanger can be provided in the same four (4) meter length of the conveyor rail because the self-weight is too large.

In such a case, the spacing of the hangers in the backward and forward direction has to be made large, resulting in lessor numbers of works that can be transferred by the transfer system. This requires extra transfer operations, thereby decreasing the operation efficiency and transfer efficiency. Moreover, the transfer system which is needlessly long as a whole must be implemented.

SUMMARY OF THE INVENTION

The present has been made to solve the above noted problems experienced in the conventional technologies described above. It is, therefore, an object of the present invention to provide a flexible conveyor rail which is significantly lighter in weight, such as by one third of the aforementioned conventional example.

It is another object of the present invention to provide a flexible conveyor rail which has a sufficient bending capability within a relatively short length, such as four meter to meet the requirements in the market.

It is a further object of the present invention to provide a flexible conveyor rail with reduced self-weight and can transfer heavy works thereon.

In the present invention, the flexible conveyor rail is achieved by incorporating a roller chain as a tension member for the flexible conveyor rail. The degree of bent in the flexible conveyor rail is regulated by the shapes of the front and rear surfaces of the conveyor elements and an amount of gaps therebetween, as well as the tension of the flexible conveyor rail determined by the roller chain.

More specifically, the present invention provides a flexible conveyor rail that is configured with a plurality of rail pieces arranged in a longitudinal direction of the flexible conveyor rail, a plurality of stopper pieces each being connected to a corresponding one of the rail pieces, a link chain for connecting each set of the rail piece and the stopper piece to other set of the rail piece and the stopper piece to be freely bent in a vertical direction. A link plate of the link chain is attached to a corresponding one of the rail pieces.

Alternatively, the flexible conveyor rail of the present invention is comprised of a plurality of rail pieces arranged in a longitudinal direction of the flexible conveyor rail, a link chain aligned on the rail pieces in the longitudinal direction, a plurality of stopper pieces each being assigned to a corresponding one of the rail pieces, wherein the flexible conveyor rail is formed by connecting approximately one unit of link plate of the link chain and one of the stopper piece to one of the rail pieces, and repeating this process throughout the flexible conveyer rail except for front and rear end portions thereof.

Each of front and rear end portions of the flexible conveyor rail is comprised of a terminal rail piece whose length is larger than that of each rail piece, terminal stopper pieces corresponding to the length of the terminal rail piece, terminal link plates of the link chain corresponding to the length of the terminal rail piece, wherein the terminal link plates of the link chain and terminal stopper pieces are attached to the terminal rail piece.

Preferably, a distance between a front surface and a back surface of two adjacent rail pieces and/or two adjacent stopper pieces is arranged to limit a degree of bent in the flexible conveyor rail by contacting the front surface and the back surface with each other. In one example, a front surface and a back surface of each of the rail pieces and/or each of the stopper pieces is perpendicular to the longitudinal direction of the flexible conveyor rail. In another example, a front surface and a back surface of each of the rail pieces and/or each of the stopper pieces is inclined either backwardly or forwardly relative to a line vertical to the longitudinal direction of the flexible conveyor rail.

Typically, each of the rail pieces has an I-shape in cross section and is comprised of an upper flange and a lower flange wherein the lower flange functions as a guide flange for rollers of hangers running thereon and an upper flange functions as a base for receiving the link chain thereon. In another example, each of the rail pieces has an inverted U-shape in cross section and includes at least a lip portion which functions as a guide flange for rollers of hangers running thereon.

Preferably, a gap formed between front and rear surfaces of one side of the lower flange of two adjacent rail pieces is shifted in a longitudinal position from a gap formed between front and rear surfaces of the other side of the lower flange of two adjacent rail pieces. In other words, the guide flange formed at one side of the lower flange is offset in the longitudinal direction relative to an end surface of the rail piece at one end while it is cut out at the other end.

According to the present invention, the flexible conveyor rail incorporates the roller chain as a tension member. Thus, the conveyor rail is free to bend within the range where the front and end faces of the rail pieces and the stopper pieces contact with one another. The link plates of the roller chain supports the flexible conveyor rail with an appropriate tension.

Hence, the degree of bent in the flexible conveyor rail can be adjusted in an appropriate range by selecting, for example, the distance between the front and end surfaces of the two rail pieces or stopper pieces and the shape of the front and end surfaces. The weight of the flexible conveyor rail can be minimized because of the simple structure and the small sized roller chain while smooth transfer of relatively heavy works can be achieved.

Moreover, since each of the components used is simple and low cost and is designed to be assembled with ease, the flexible conveyor rail of the present invention can be effective in producing a transfer rail system of high operating efficiency, high quality and low cost.

BRIEF DESCRIPTION OF THE DRAWINGS

FIG. 5 is a side view showing the bending conditions with respect to different position of the end of the flexible conveyor rail, a higher position, lower position, and an intermediate position, incorporated in a transfer system with different vertical levels.

DETAILED DESCRIPTIONS OF THE PREFERRED EMBODIMENTS

Figure 1:
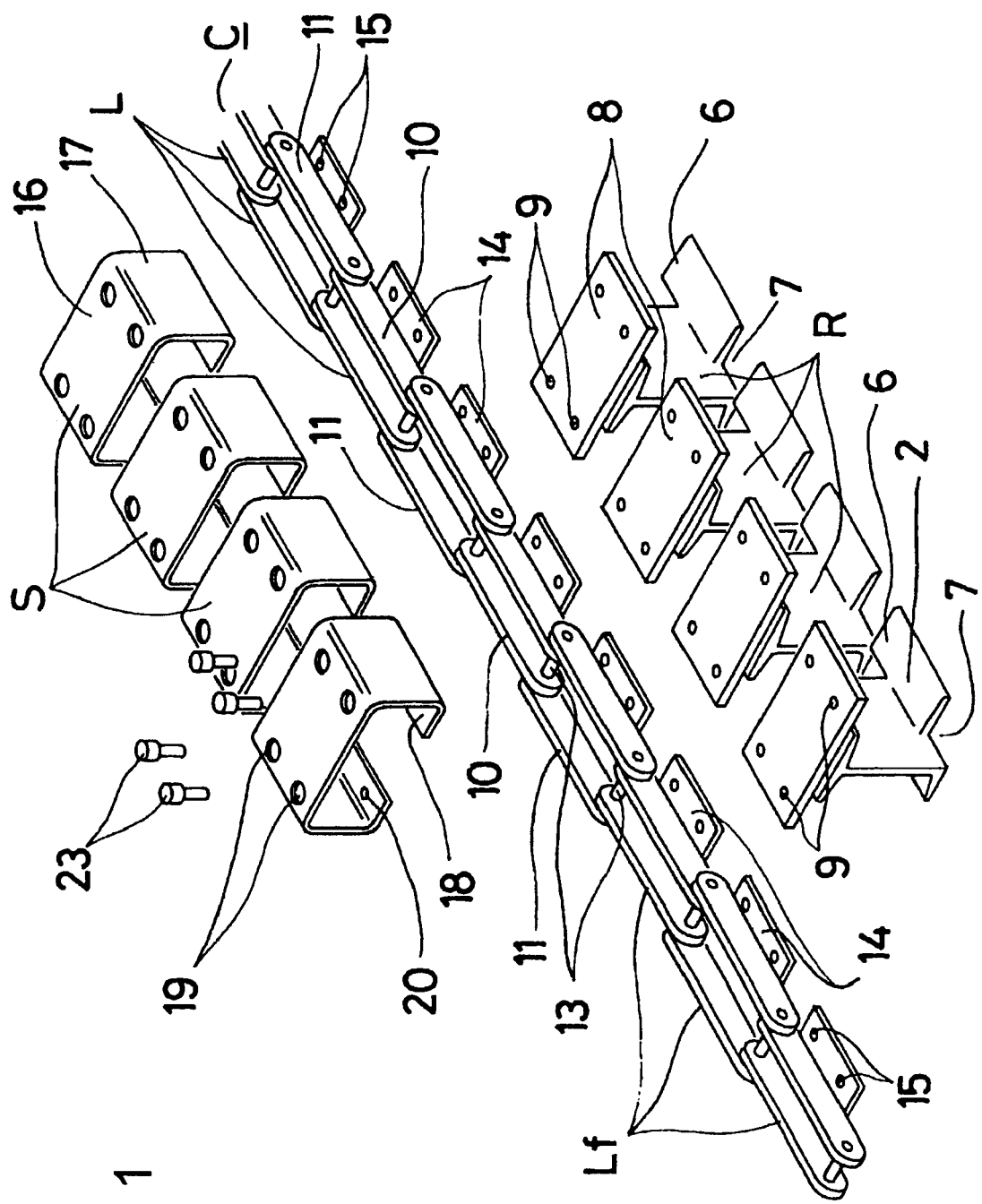
FIG. 1 is a perspective view showing major components in the main portion of the flexible conveyor rail of the present invention in an exploded manner. The flexible conveyor rail of FIG. 1 shows a roller chain having link plates, stopper pieces above the roller chain, and rail pieces under the roller chain.

The embodiments of the present invention are explained in detail with reference to the accompanying drawings. FIGS. 1-7 show the first embodiment of the flexible conveyor rail F.

In the drawings, reference label R designates rail pieces that are produced by cutting an I-shaped steel into small pieces (heretofore, also referred to as "I-shaped rail"). At the top and bottom of the rail piece R, an upper flange 1 and a lower flange 2 each being extended in right and left are formed. At the center of the rail piece R, a vertical plate 3 is formed which integrally connects the upper flange 1 and the lower flange 2. The lower flange 2 functions as a guide flange for a guide roller M (FIGS. 6 and 7) in a trolley transfer system or a conveyor chain transfer system.

Figure 6:
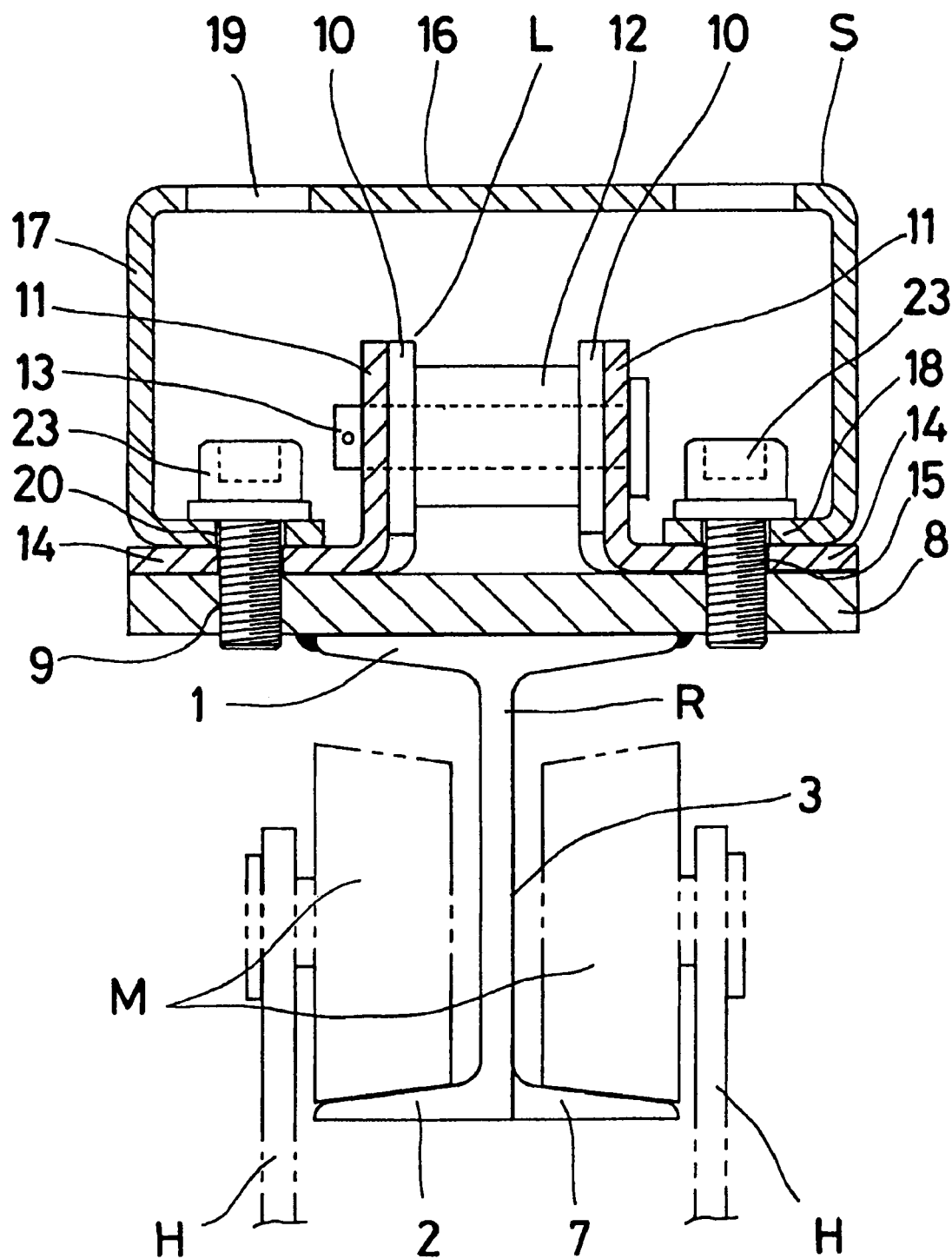
FIG. 6 is an enlarged cross section front view showing an essential portion of the flexible conveyor rail of the present invention.
Figure 7:
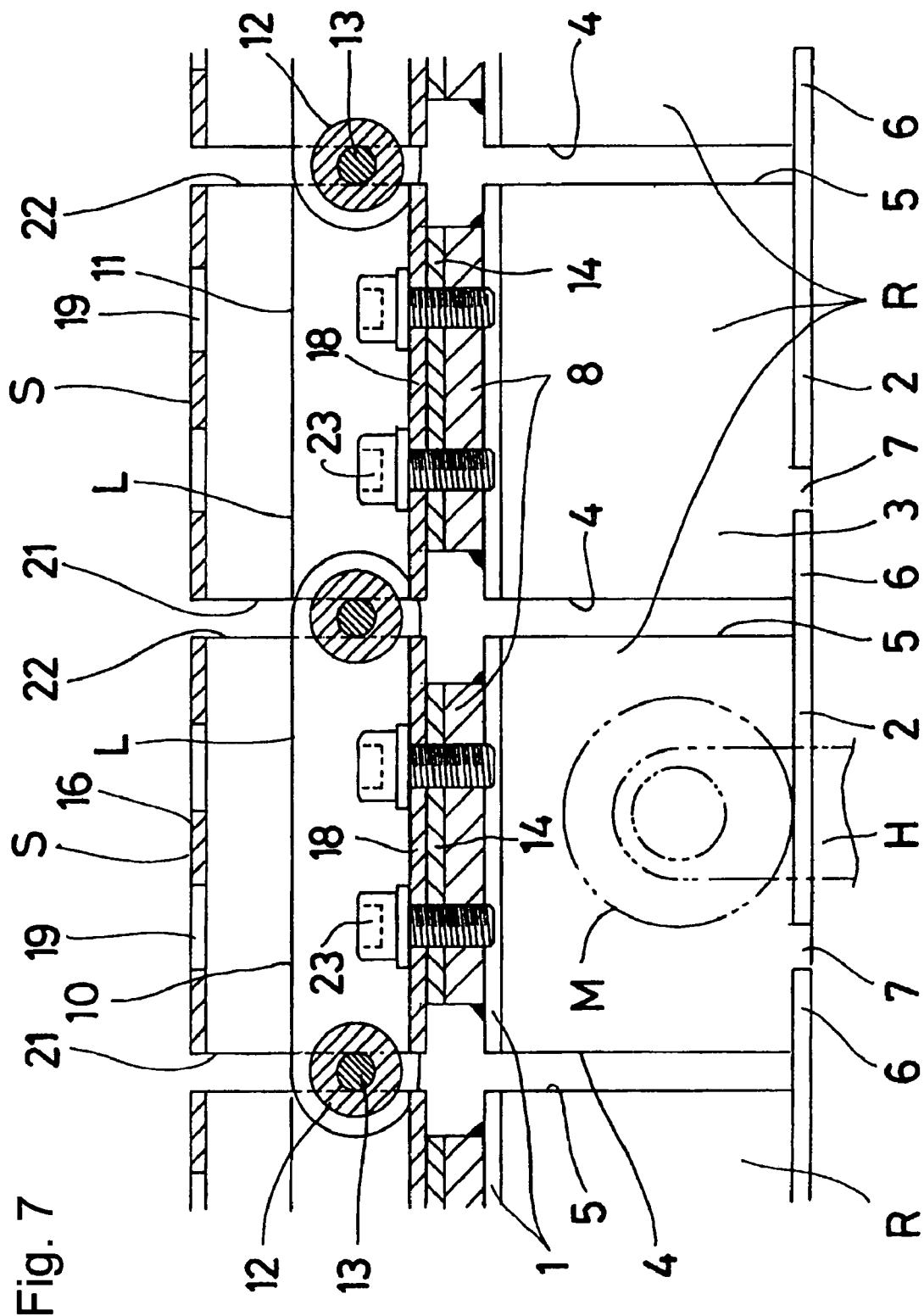
FIG. 7 is an enlarged cross section side view showing an essential portion of the flexible conveyor rail of the present invention.

As shown by the phantom lines of FIGS. 6 and 7, the trolley transfer is performed by the rotation of the pair of guide rollers M along the lower flange 2. The guide rollers M are symmetrically formed at the top of the hunger H on the lower flange 2.

In the I-shaped rail, rail width, height, and thickness are selected based on the intended weight or size of each work to be loaded on each hunger. More specifically, an I-shaped rail of three (3) inch type (width 75 mm, height 100 mm, and thickness 5 mm) is appropriate for the work transfer of 150 kg per hunger. An I-shaped rail of four (4) inch type (width 100 mm, height 180 mm, and thickness 6 mm) is suitable for the work transfer of 300 kg per hunger, and an I-shaped rail of six (6) inch type (width 150 mm, height 200 mm, and thickness 9 mm) is appropriate for the work transfer of 600 kg per hunger.

Figure 2:
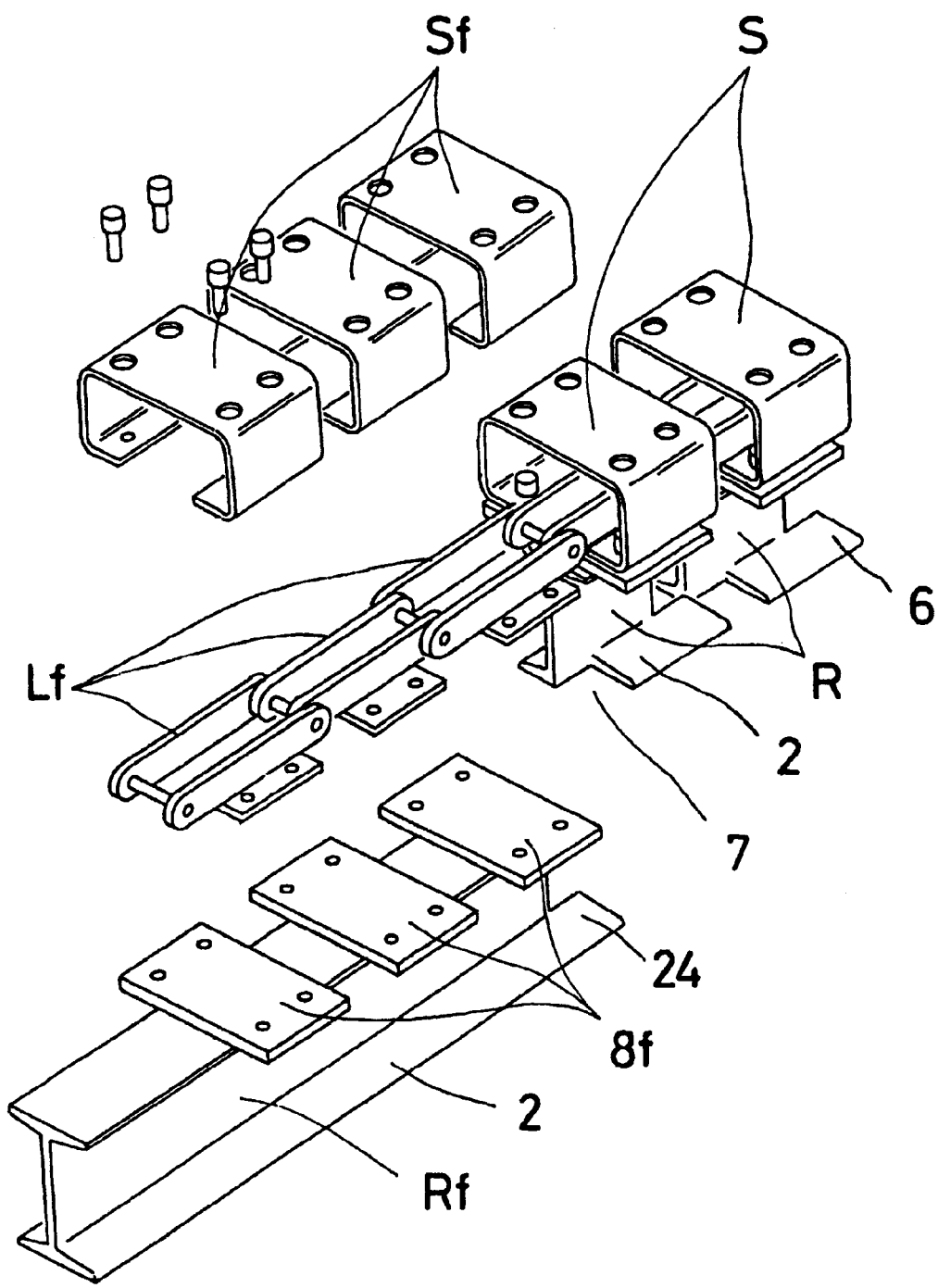
FIG. 2 is a perspective view showing major components in the front end portion of the flexible conveyor rail of the present invention in an exploded manner. The front end portion of the flexible conveyor rail of FIG. 2 shows a roller chain having link plates, stopper pieces above the roller chain, and a rail piece having length equivalent to about three units of link plates under the roller chain.
Figure 3:
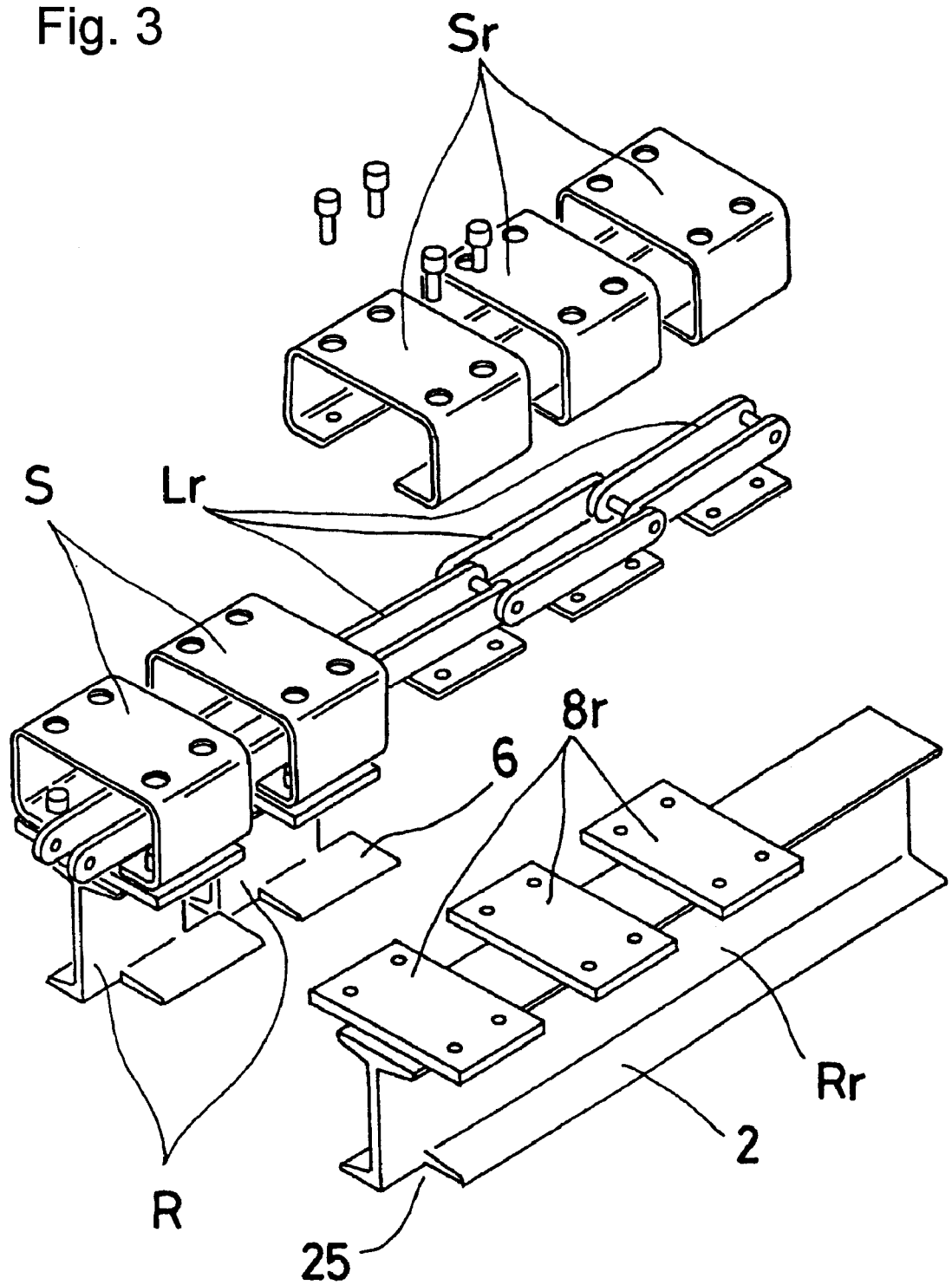
FIG. 3 is a perspective view showing major components in the rear end portion of the flexible conveyor rail of the present invention in an exploded manner. The rear end portion of the flexible conveyor rail of FIG. 3 shows a roller chain having link plates, stopper pieces above the roller chain, and a rail piece having length equivalent to about three units of link plates under the roller chain.

Numerals 4 and 5 (best shown in FIG. 7) designate a front end surface and a back end surface, respectively, of the rail piece R. As shown in FIGS. 1-3, one side projection 6 of the lower flange 2 is offset in the forward and backward direction. In other words, the one side projection 6 of the lower flange 2 is not in the same position as the front and back end surfaces 4 and 5, but is backwardly shifted relative to the back end surface 5. A cut out (recess) 7 is provided at the front of the one side of the lower flange 2 which is opposite to the one side projection 6 as shown in FIGS. 1 and 7. The cut out 7 is to ensure a clearance for the one side projection 6 and the vertical plate 3 of the rail piece R which is one unit ahead. The length of the rail piece R is shorter, by about 8 mm, than the distance between two link shafts (pivot shafts) of a roller chain to be explained later.

Numeral 8 designates a base plate fixed to the upper surface of the rail piece R and having a substantial thickness to support a roller chain and a stopper piece. The base plate 8 has width which is wider than that of the upper flange 1 or lower flange 2 of the I-shaped rail piece R. The length of the base plate 8 is about the same or slightly shorter than that of the I-shaped rail piece R. The base plate 8 is fixed to the upper surface of the rail piece R through, for example, welding. The base plate 8 has screw holes 9 at four corners thereof.

Reference label C designates a link chain installed on the upper surface of the base plate 8 in the backward and forward direction. More specifically, the link chain C is a roller chain where each pair of an inner link plate L (heretofore, also referred to as "inner link 10") and an outer link plate L (heretofore, also referred to as "outer link 11") is alternately connected to one another in the backward and forward direction. The connection between the inner link 10 and the outer link 11 is supported by a roller 12 and a link shaft (pivot shaft) 13 which also act as a spacer. In this example, the length of the link plate L in the roller chain C, that is, the distance between the two adjacent link shafts, is 100 mm.

Numeral 14 designates a bracket to attach the roller chain C to the rail piece R. Each bracket 14 extends at the bottom of the inner link 10 or the outer link 11 to the outside. The bracket 14 includes holes 15 provided at the front and back thereof.

Reference label S designates stopper pieces that are made by cutting a lip channel steel into small pieces. The stopper pieces S are mounted in an inverse U-shape manner so that the open area of each stopper piece faces downward. Each stopper piece S is comprised of an upper plate 16 at the upper area, side plates 17 at right and left area, and a lip 18 at the bottom of the right and left area. At four corners of the upper plate 16, holes 19 are provided for inserting bolts therethrough. Namely, the holes 19 are larger than the head of the bolts in diameter. At the front and back of the lip 18, holes 20 for bolts are provided right under the holes 19. Numerals 21 and 22 (FIG. 7) respectively designate front and back surfaces of the stopper piece S. The length of the stopper piece S between the front and back surfaces 21 and 22 is shorter, by about 5 mm, than the distance between the two link shafts 13 of the link plate L, i.e., 100 mm, of the roller chain C.

An assembly procedure is explained in the following wherein the body of a flexible conveyor rail F of the present invention is established by assembling a plurality of rail pieces R each having the base plate 8, more particularly, 35 rail pieces R, the roller chain C with the length of about four (4) meter, and the stopper pieces S of the same number as that of the rail pieces, i.e., about 35.

As shown in FIG. 1, a plurality of rail pieces R with base plates 8 are aligned almost straight in the forward and backward direction. Each rail piece R is positioned to have an appropriate space between the front to back which is, for example, about 8 mm. On the upper surfaces of the base plates 8 of the rail pieces R, the roller chain C is mounted in a longitudinal direction. It is preferable that the roller chain C has an extra length of about three units at both ends, i.e., front end link plates Lf and rear end link plates Lr, such as shown in FIG. 1, to be used for fixing the flexible conveyor rail F to the transfer system.

Thus, at the fourth unit of the roller chain C from the end, the link plate L is attached to the corresponding rail piece R at the upper surface of the base plate 8. Over the roller chain C, the corresponding stopper piece S are assembled. For that purpose, the holes 15 of the bracket 14 of the inner link 10 or the outer link 11 of the link plate L and the holes 9 located at the four corners of the base plate 8 on the rail piece R are matched vertically. Then, from the top, the stopper piece S is placed on the roller chain C. The holes 19 and 20 of the stopper piece S are positioned to match the holes 15 of the bracket 14.

The lower portion of the bolts 23 coming through the holes 19 located at four corners of the stopper piece S go through the holes 20 on the lip portion 18 of the stopper piece S. By rotating the heads of the bolts 23 by, for example, a hexagonal wrench (not shown), the bolts 23 are fixed to the screw holes 9 of the base plate 8 to connect the link plate L, the stopper piece S and the rail piece R to one another as shown in FIG. 6.

Similarly, the fifth link plates L of the roller chain C is assembled with the base plate 8 of the corresponding rail piece R at the bottom and with the stopper piece S at the top with use of four bolts 23 after positioning the holes noted above. In this manner, except for the front end link plates Lf and rear end link plates Lr equivalent to about three units length of the roller chain C, a plurality of units each consisting of the link plate L, the rail piece R and the stopper piece S are connected in an orderly manner. Hence, the main body of the flexible conveyor rail F is established which can be freely bent relative to the link shaft 13 as a fulcrum of the roller chain C.

The front and rear end portions of the flexible conveyor rail F of the present invention are shown in FIGS. 2-4. As noted above, the front end link plates Lf and rear end link plates Lr equivalent to about three units length of the roller chain C are not assembled with the stopper piece S or rail piece R. As shown in FIGS. 2 and 3, for the front and rear end portions of the conveyor rail, I-shaped terminal rails Rf and Rr are respectively used. The front terminal rail Rf is an end rail piece connected to the front end of the flexible conveyor rail F. The rear terminal rail Rr is an end rail piece connected to the rear end of the flexible conveyor rail F.

In this example, base plates $8f$ equivalent to three base plates 8 on the rail piece R are bonded, by welding for example, to an upper surface of the front terminal rail Rf as shown in FIG. 2. Similarly, base plates $8r$ equivalent to three base plates 8 on the rail piece R are bonded, by welding for example, to an upper surface of the rear terminal rail Rr as shown in FIG. 3. Numeral 24 in FIG. 2 designates a rearward offset of the lower flange 2 of the front terminal rail Rf projected from the end surface thereof. Numeral 25 in FIG. 3 designates a cut out (recess) of the lower flange 2 of the rear terminal rail Rr indented at the front surface thereof.

The main body of the flexible conveyor rail F formed in the manner described in the foregoing, the front terminal rail Rf and the rear terminal rail Rr are brought to a field where a final assembly process has to be made. As shown in FIGS. 2 and 3, at the front and rear ends of the main body of the flexible conveyor rail F, the front terminal rail Rf and the rear terminal rail Rr are aligned on a straight line. On the base plates $8f$ and $8r$ of the terminal rails Rf and Rr, respectively, three units of the front end link plates Lf and rear end link plates Lr equivalent to about three units length of the roller chain C projected from the front and rear of the flexible conveyor rail F are respectively set.

Three stopper pieces Sf for the front end link plates Lf are positioned in the manner noted above with respect to the assembly of the main body. Thus, the screws 23 are inserted through the holes 19 and 20 of the stopper pieces Sf, holes 15 on the brackets 14, and the holes 9 on the base plates $8f$ in FIG. 2 to fasten the stopper pieces Sf, link plates Lf and the terminal rail Rf. Similarly, stopper pieces Sf for the rear end link plates Lr are positioned in the manner noted above with respect to the assembly of the main body. Thus, the screws 23 are inserted through the holes 19 and 20 of the stopper pieces Sr, holes 15 on the brackets 14, and the holes 9 on the base plates $8r$ in FIG. 3 to fasten the stopper pieces Sr, link plates Lr and the terminal rail Rr. Consequently, a whole body of the flexible conveyor rail F is completed as shown in the side view of FIG. 4A.

The reason that the front end and the rear end of the flexible conveyor rail use the longer terminal rail pieces and three units of stopper pieces and link plates as above is to firmly attach the flexible conveyor rail to the transfer system. Generally, if the works to be transferred on the flexible conveyor rail are light weight, the terminal rail pieces can be small such as the same size as the other rail pieces, and only one stopper piece and ling plate can be used at each end. In contrast, if the works to be transferred are heavy, longer terminal rail pieces such as shown in FIGS. 2 and 3 are preferable.

Figure 4A:
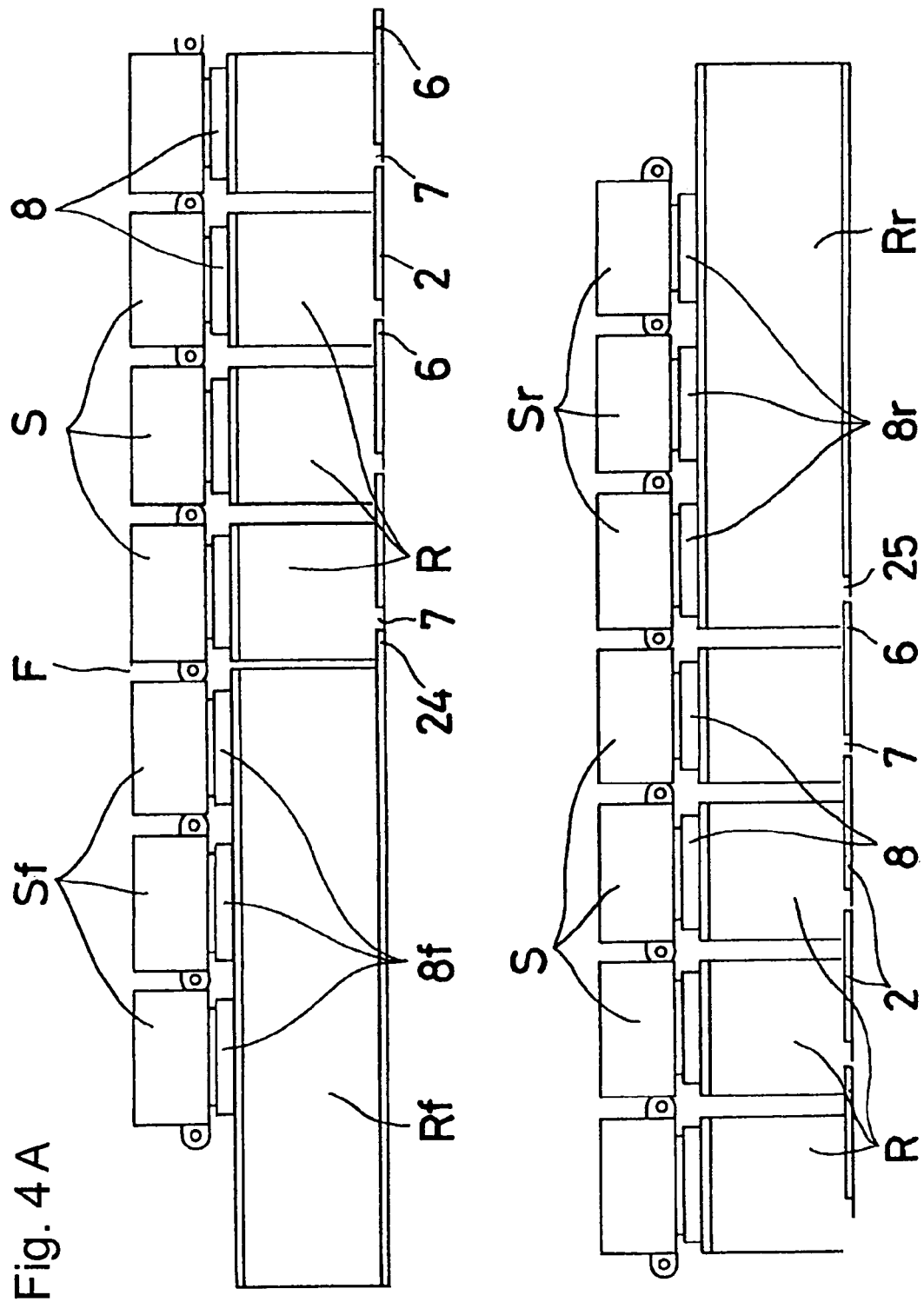
FIG. 4A is a side view showing the flexible conveyor rail having the components of FIGS. 2 and 3. The upper part of FIG. 4 shows the front end portion of the flexible conveyor rail assembled based on FIG. 2, and the lower part of FIG. 4 shows the rear end portion of the flexible conveyor rail assembled based on FIG. 3.
Figure 4B:
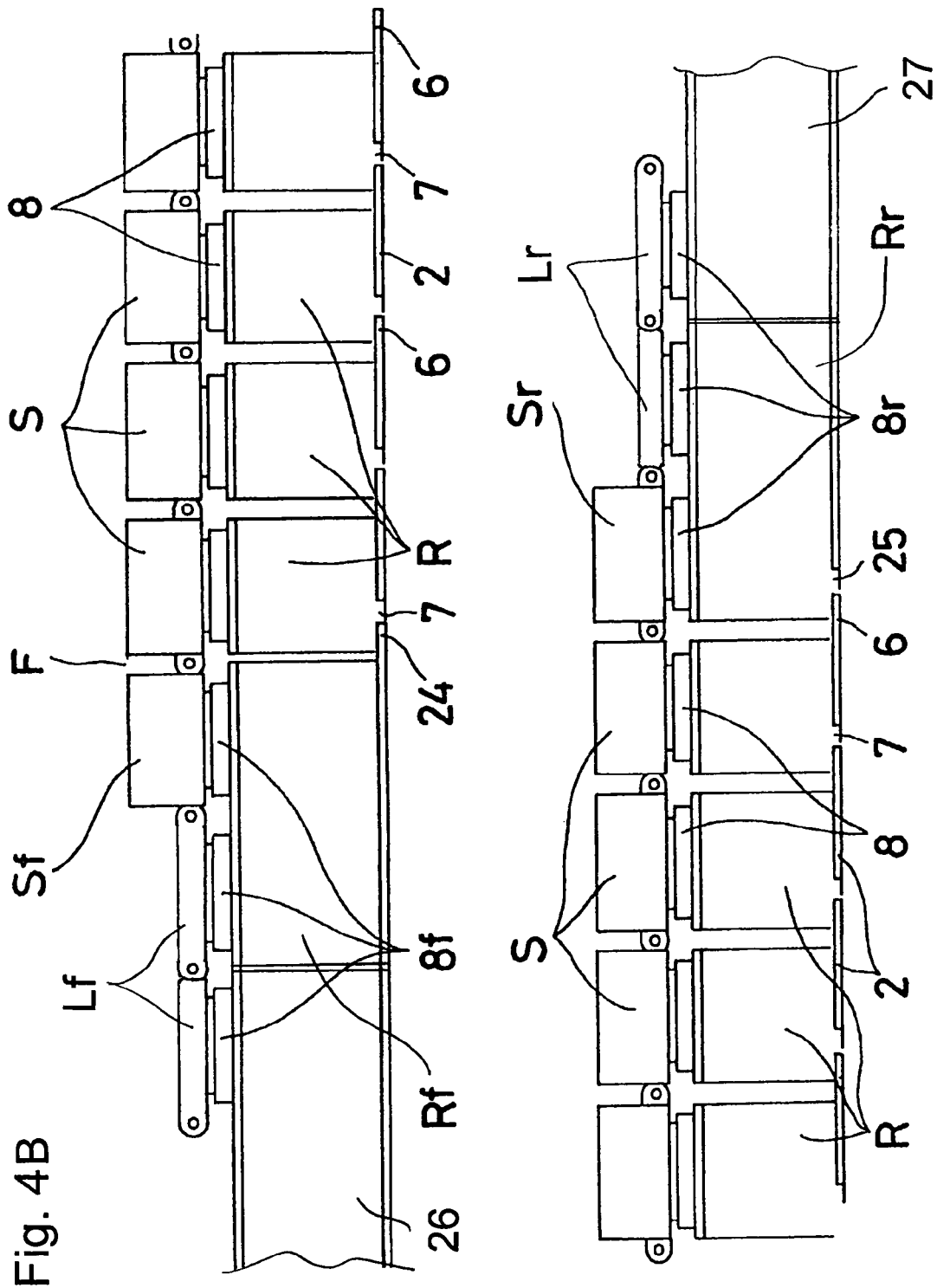
FIG. 4B is a side view showing the modified structure at the front and rear ends of the flexible conveyor rail of the present invention.

Thus, as shown in FIG. 4B, as a modified version of the present invention, only one stopper piece Sf which is the same size as the stopper piece S in the main body of the flexible conveyor rail can be used at each end. In this example, it is preferable for the link plate Lf to have two or more units at each end to be securely attached to the terminal rail piece Rf or Rr with sufficient mechanical strength, although only one unit of link plate is also possible. The stopper piece Sf functions to limit the degree of bending the flexible rail as well as to attach the link plate to the terminal rail piece Rf or Rr.

Also in FIG. 4B, if the rails 26 and 27 of transfer devices A and B (FIG. 5) have sufficient length to receive the link plates L and stopper pieces S of the flexible conveyor rail, the front and rear terminal rail pieces Rf and Rr can be shorter than the examples in FIGS. 2 and 3 or even obviated from the conveyor rail.

Further, in the example described above in FIGS. 2 and 3, about three units of the base plates $8f$ and $8r$ are attached at the end of the front and rear terminal rails Rf and Rr, respectively, with appropriate spacing. However, it is also possible to replace the three base plates with one body of base plate (not shown) elongated to the front and back direction for each of the terminal rails Rf and Rr.

Similarly, in the above example, the three stopper pieces Sf and the three stopper pieces Sr are attached to the respective front and rear terminal rails Rf and Rr. However, it is also possible to replace the three stopper pieces Sf or Sr with one body of stopper piece (not shown) which is longer than that of the stopper piece Sr or Sr. Such stopper pieces can be made by cutting a lip channel steel to be attached to the front terminal link plate Lf and the rear terminal link plate Lr, respectively.

In the embodiment described in the foregoing, the base plates 8, $8f$, and $8r$ are connected through welding to the upper surfaces of the rail pieces R, front and rear terminal rail Rf and Rr. However, in the case where the rail piece R has a sufficiently large surface such as five (5) inches or more, and made of I-shaped steel or H-shaped steel, thereby having a sufficiently large upper flange, the base plate 8, $8f$, and $8r$ are unnecessary.

FIG. 5 shows examples of situation where the flexible conveyor rail F of the present invention is used between a transfer device A and a transfer device B. In this example, the vertical position of the transfer device A is adjustable relative to the vertical position of the transfer device B. When assembling the flexible conveyor rail F with the transfer devices A and B, the flexible conveyor rail F having the terminal rails Rf and Rr are lifted to an appropriate position by a crane or a hoist (not shown). Then, one of the terminal rails, such as the front terminal rail Rf is attached to the transfer device A and the other terminal rail, i.e., the rear terminal rail Rr is attached to the transfer device B. Numerals 26 and 27 designate conveyor rails at the transfer devices A and B, respectively, and connected to the ends of the flexible conveyor rail F of the present invention.

When the transfer device A moves up and down, the rail pieces R and the stopper pieces S in the main body of the flexible conveyor rail F1, excluding the front terminal rail Rf and the rear terminal rail Rr, maintains an appropriate tension by the roller chain C. Thus, the flexible conveyor rail F of the present invention is curved in the up and down direction by the small rotation made about the link shaft 13 between two adjacent rail pieces R.

Accordingly, when the transfer device A is lifted or pressed upward to the upper left position of FIG. 5, the flexible conveyor rail F gradually bends downward to the right. Conversely, when transfer device A descends to the lower left position of FIG. 5, the flexible conveyor rail F bends upward to the right. Further, in the case where the transfer device A is in the intermediate position, the flexible conveyor rail F bends symmetrically while maintaining the tension by the roller chain C, thus being curved as shown by the phantom line in middle portion of FIG. 5.

In the flexible conveyor rail hanged in the manners shown in FIG. 5, at the locations near the front and rear ends of the flexible conveyor rail F, the front end surface and the back end surface of the lower flanges 2 at the rail pieces R are contacting with each other. Also in this situation, the front end surface and the back end surface of the upper plates 16 of the stopper pieces S are contacting with each other. In this manner, the bending condition at around the ends of the flexible conveyor rail is determined.

At the intermediate portion of the flexible conveyor rail F, i.e., other than the front and rear ends of the flexible conveyor rail F, the bending condition is determined by the tension of the roller chain C while maintaining the small space between the front and back surfaces of the adjacent two stopper pieces or rail pieces. Hence, an appropriate stroke in the up and down direction of the flexible conveyor rail F is maintained.

At the flexible rail conveyor rail F of the present invention, hangers H are downwardly incorporated through the guide rollers M which travel along the rail pieces R. Works are attached to the hanger H and transferred through the conveyor rail F when a chain conveyor (not shown) attached to the conveyor rail is driven by a power source (not shown). In this arrangement, for smoothly travelling the guide rollers M on the flexible conveyor rail (trolley conveyor), it is not desirable to have spaces (gaps) at the same location of the left side and the right side of the lower flange 2 between the two adjacent rails pieces R. Especially, such spaces or gaps between the two rail pieces adversely affect the ability for transferring the heavy works by the flexible conveyor rail F.

Therefore, in the present invention, it is designed so that the gap in the one side of the lower flange 2 between the two adjacent rail pieces R is shifted from the gap in the other side. More particularly, at one side of the lower flange 2, the one side projection 6 is formed at one end while at the opposite end, the cut out (recess) 7 is formed. Therefore, the gap between the front end and the back end of the two adjacent rail pieces R in one side of the lower flange 2 is in the different position from that of the other side of the lower flange 2. Also, at the front and rear terminal rails Rf and Rr in FIGS. 2 and 3, the projection 24 and the cut out (recess) 25 are formed in the manner similar to the foregoing.

Since the front and back ends of the lower flange 2 of the rail pieces R are not facing each other at the same position in the right and left sides of the lower flange, the weight of the work does not directly concentrate on the gap between the adjacent two rail pieces R. Hence, smooth transfer of the heavy works is achieved when the guide rollers M are travelling on the lower flanges 2 of the rail pieces R.

In the embodiment described in the foregoing, the front end and back end surfaces of the rail piece R or the surfaces of the terminal rails Rf and Rr are vertically formed, i.e., perpendicular to the longitudinal direction of the flexible conveyor rail. Also, the front and back end surfaces of the stopper piece S and the terminal stopper pieces Sf and Sr are almost vertical, i.e., perpendicular to the longitudinal, direction of the flexible conveyor rail. As a consequence, the front end surface and the back end surface of the adjacent rail pieces R as well as the surfaces of the terminal rails Rf and Rr contact with each other, thereby limiting and defining the angle of bent in the flexible conveyor rail F. Similarly, the front end surface and the back end surface of the stopper pieces S as well as the surfaces of the terminal stopper pieces Sf and Sr contact with each other, thereby limiting and defining the angle of bent in the flexible conveyor rail F.

The facing surfaces noted above are not necessarily strictly vertical relative to the longitudinal direction. Thus, the front and back surfaces of the rail pieces R and the front and rear terminal rails Rf and Rr can be forwardly inclined relative to the vertical line or the front and back surfaces of the lower flange 2 of the rail pieces R can be forwardly inclined relative to the vertical line. Similarly, the front and back surfaces of the stopper pieces S and the terminal stopper pieces Sf and Sr can be backwardly inclined relative to the vertical line.

By having the inclined front and back surfaces noted above, the contact pressure on the surfaces facing each other between the rail pieces R, at the front and rear terminal rails Rf and Rr or the rail piece R further increases. Similarly, the contact pressure on the surfaces facing each other between the stopper pieces S, at the terminal stopper pieces Sf and Sr further increases. Accordingly, the inclined surfaces are effective in limiting and defining the angle of bent in the conveyor rail, especially when the weight of the works to be transferred is large.

In the aforementioned embodiment, the flexible conveyor rail F of the present invention is configured by mounting the link plates L of the roller chain C and the stopper pieces S on the upper surfaces of the base plates 8 of the rail pieces R. By arranging the conveyor rails in, parallel separately with a certain space therebetween, the work transfer system of a cross bar conveyor can be established.

In the aforementioned embodiment, the I-shaped rail pieces each having the upper flange 1, the lower flange 2, and the vertical plate 3 are used. Such I-shaped rail pieces are made, for example, by cutting the I-shaped steel into small pieces. Instead of the I-shaped rail pieces, other types of rail pieces such as lip channel C-shaped rail pieces can be used in the flexible conveyer rail of the present invention. Such a lip channel C-shaped rail pieces can be formed by connecting the backs of two lip channels having a C-shape in cross section.

Figure 8:
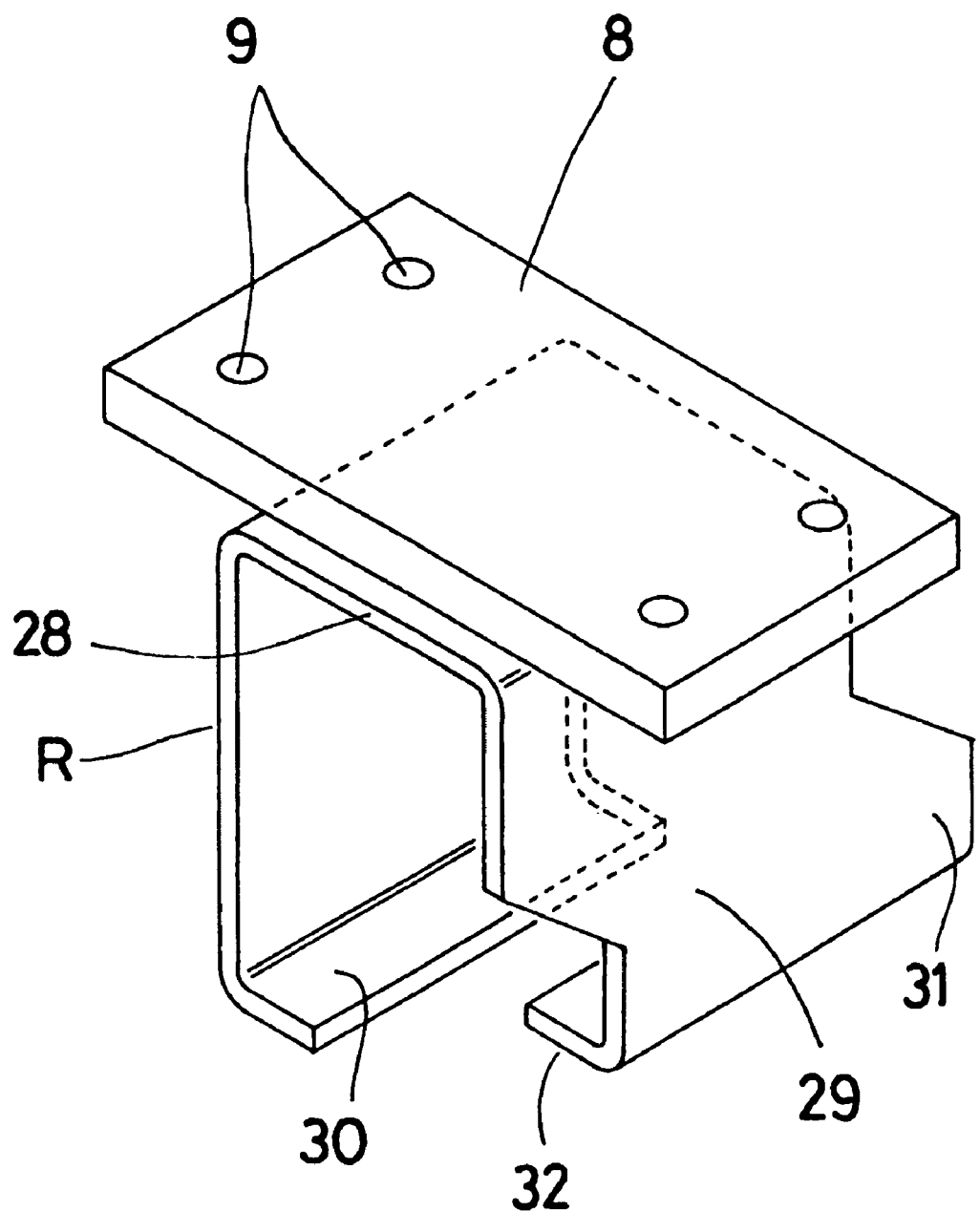
FIG. 8 is a perspective view showing the second embodiment of the present invention wherein a lip channel structure is incorporated as rail pieces instead of the I-shaped structure.
Figure 9:
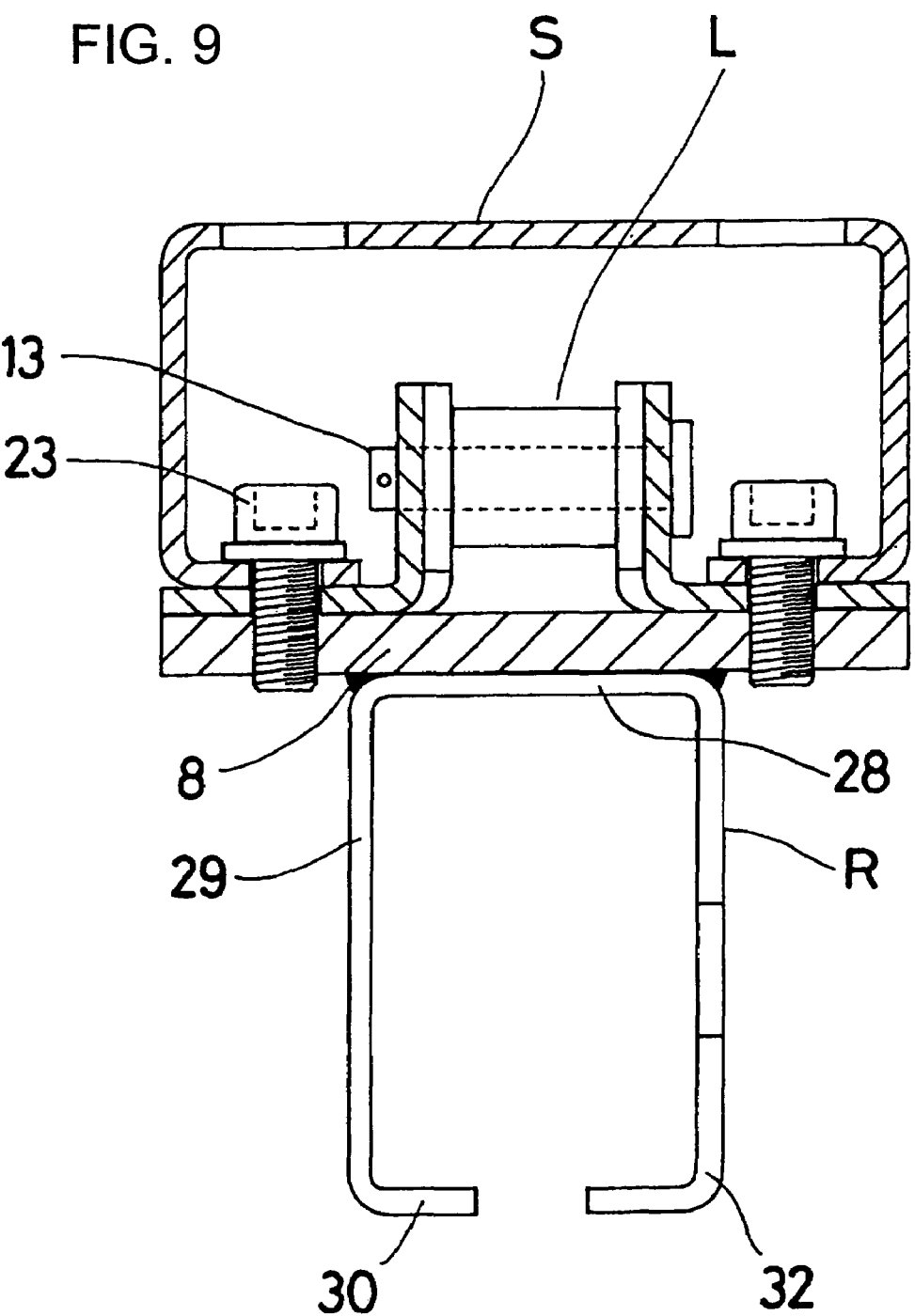
FIG. 9 is a cross section front view showing an essential portion of the second embodiment of the present invention.

FIGS. 8 and 9 show the second embodiment of the present invention. In this embodiment, rail pieces R based on lip channel steel are used instead of the I-shaped rail pieces. Each of the rail pieces R has an inverted U-shape which includes an upper plate 28, side plates 29 at left and right sides, and a pair of lip portions 30 inwardly bent at the bottom of the side plates 29. Preferably, as shown in FIG. 9, one of the side plates 29 and the lip portion 30 are projected backwardly from the rear end surface of the rail piece R to create a projection 31 at the rear. Also to meet the projection 31 in the adjacent rail piece R, a cut out 32 is created on the same side plate 29 at the front of the rail piece R.

Other components of the flexible conveyor rail of the second embodiment can be configured in the same manner as the first embodiment described above. Thus, identical numerals are used in FIGS. 8 and 9 for the components which are the same or similar to that of the first embodiment, and their detailed explanation is omitted.

When the flexible conveyor rail of the second embodiment is implemented in a transfer system, such as explained with reference to the first embodiment, the work transfer capacity of about 75 kg per hanger can be achieved. Thus, the second embodiment is suitable for a transfer system dealing with relatively light weight works.

As has been described above, the present invention provides the flexible conveyor rail which incorporates the link chain as a tension member. Thus, the conveyor rail is free to bend within the range where the front and end faces of the rail pieces and the stopper pieces contact with one another. The link plates of the roller chain supports the flexible conveyor rail with an appropriate tension.

Hence, the degree of bent in the flexible conveyor rail can be adjusted in an appropriate range by selecting, for example, the distance between the front and end surfaces of the two rail pieces or stopper pieces and the shape of the front and end surfaces. The weight of the flexible conveyor rail can be minimized because of the simple structure and the small sized roller chain while smooth transfer of relatively heavy works can be achieved.

Moreover, since each of the components used is simple and low cost and is designed to be assembled with ease, the flexible conveyor rail of the present invention can be effective in producing a transfer rail system of high operating efficiency, high quality and low cost.

Although only a preferred embodiment is specifically illustrated and described herein, it will be appreciated that many modifications and variations of the present invention are possible in light of the above teachings and within the purview of the appended claims without departing the spirit and intended scope of the invention.

What is claimed is:

1. A flexible conveyor rail, comprising:
   a plurality of rail pieces arranged in a longitudinal direction of said flexible conveyor rail;
   a plurality of stopper pieces each being connected to a corresponding one of said rail pieces;
   a link chain for connecting each set of said rail piece and said stopper piece to other set of said rail piece and said stopper piece to be freely bent in a vertical direction; and
   wherein a link plate of said link chain is attached to a corresponding one of said rail pieces.

2. A flexible conveyor rail as defined in claim 1, wherein, each of front and rear end portions of said flexible conveyor rail is comprised of:
   a terminal rail piece provided at each of said front and rear end portions;
   a terminal link plate to be attached to said each terminal rail piece; and
   a terminal stopper piece for attaching said terminal link plate to said each terminal rail piece.

3. A flexible conveyor rail as defined in claim 2, wherein:
   said terminal rail piece has a length which is longer than that of each rail piece;
   said terminal stopper piece has the same size as said stopper piece or has a combination of two or more of said terminal stopper pieces whose sum of length corresponds to the length of said terminal rail piece;
   said terminal link plate has the same size as said link plate or has a combination of two or more terminal link plates whose sum of length corresponds to the length of said terminal rail piece;
   wherein said terminal link plates of said link chain and terminal stopper pieces are attached to the terminal rail piece.

4. A flexible conveyor rail as defined in claim 2, wherein:
   said terminal rail piece has a length which is longer than that of each rail piece;
   said terminal stopper piece which is integrally formed and has a length corresponding to that of said terminal rail piece; and
   said terminal link plate has a plurality of link plates whose sum of length corresponds to the length of said terminal rail piece;
   wherein said terminal link plate with said plurality of link plates and said terminal stopper integrally formed are attached to the terminal rail piece.

5. A flexible conveyor rail as defined in claim 1, wherein said link chain provides a tension of said flexible conveyor rail, thereby limiting a degree of bent of said flexible conveyor rail when mounted on a transfer system.

6. A flexible conveyor rail as defined in claim 1, wherein a distance between a front surface and a back surface of two adjacent rail pieces and/or two adjacent stopper pieces is arranged to limit a degree of bent in said flexible conveyor rail by contacting the front surface and the back surface with each other.

7. A flexible conveyor rail as defined in claim 1, wherein a front surface and a back surface of each of said rail pieces and/or each of said stopper pieces is perpendicular to the longitudinal direction of said flexible conveyor rail.

8. A flexible conveyor rail as defined in claim 1, wherein a front surface and a back surface of each of said rail pieces and/or each of said stopper pieces is inclined either backwardly or forwardly relative to a vertical line which is perpendicular to the longitudinal direction of said flexible conveyor rail.

9. A flexible conveyor rail as defined in claim 1, wherein each of said rail pieces has an I-shape in cross section and is comprised of an upper flange and a lower flange wherein said lower flange functions as a guide flange for rollers of hangers running thereon and said upper flange functions as a base for receiving said link chain thereon.

10. A flexible conveyor rail as defined in claim 1, wherein each of said rail pieces has an I-shape in cross section and is comprised of an upper flange and a lower flange wherein said lower flange functions as a guide flange for rollers of hangers running thereon and said upper flange functions as a base on which a base plate is connected for receiving said link chain thereon.

11. A flexible conveyor rail as defined in claim 9, wherein a gap formed between front and rear surfaces of one side of said lower flange of two adjacent rail pieces is shifted in longitudinal position from a gap formed between front and rear surfaces of the other side of said lower flange of two adjacent rail pieces.

12. A flexible conveyor rail as defined in claim 9, wherein said guide flange formed at one side of said lower flange is offset in the longitudinal direction relative to an end surface of said rail piece at one end while there is a cut out at the other end.

13. A flexible conveyor rail as defined in claim 1, wherein each of said rail pieces or each of said stopper pieces is shorter than a distance between two link shafts connecting the link plates of said link chain.

14. A flexible conveyor rail as defined in claim 1, wherein each of said stopper pieces has an inverted U-shape in cross section.

15. A flexible conveyor rail as defined in claim 1, wherein each of said rail pieces has an inverted U-shape in cross section and includes at least a lip portion which functions as a guide flange for rollers of hangers running thereon.

16. A flexible conveyor rail as defined in claim 1, wherein said link plate of said link chain is provided with a bracket at a bottom so as to be connected to said rail piece through said bracket.

17. A flexible conveyor rail as defined in claim 1, wherein said link plate of said link chain is provided with a bracket at a bottom, and said rail piece is provided with a base plate at its top, wherein holes are respectively formed on said stopper piece, bracket and base plate so that said stopper piece, link plate and rail piece are connected by fastening bolts through said holes.

18. A flexible conveyor rail, comprising:
   a plurality of rail pieces arranged in a longitudinal direction of said flexible conveyor rail;
   a link chain aligned on the rail pieces in the longitudinal direction;
   a plurality of stopper pieces each being assigned to a corresponding one of said rail pieces;

wherein said flexible conveyor rail is formed by connecting approximately one unit of link plate of said link chain and one of said stopper piece to one of said flexible rail pieces and repeating this process throughout the flexible conveyer rail except for front and rear end portions thereof.

19. A flexible conveyor rail as defined in claim 18, wherein, each of front and rear end portions of said flexible conveyor rail is comprised of:
   a terminal rail piece provided at each of said front and rear end portions;
   a terminal link plate to be attached to said each terminal rail piece; and
   a terminal stopper piece for attaching said terminal link plate to said each terminal rail piece.

20. A flexible conveyor rail as defined in claim 19, wherein:
   said terminal rail piece has a length which is longer than that of each rail piece;
   said terminal stopper piece has the same size as said stopper piece or has a combination of two or more of said terminal stopper pieces whose sum of length corresponds to the length of said terminal rail piece;
   said terminal link plate has the same size as said link plate or has a combination of two or more terminal link plates whose sum of length corresponds to the length of said terminal rail piece;
   wherein said terminal link plates of said link chain and terminal stopper pieces are attached to the terminal rail piece.

21. A flexible conveyor rail as defined in claim 19, wherein:
   said terminal rail piece has a length which is longer than that of each rail piece;
   said terminal stopper piece which is integrally formed and has a length corresponding to that of said terminal rail piece; and
   said terminal link plate has a plurality of link plates whose sum of length corresponds to the length of said terminal rail piece;
   wherein said terminal link plate with said plurality of link plates and said terminal stopper integrally formed are attached to the terminal rail piece.

22. A flexible conveyor rail as defined in claim 18, wherein said link chain provides a tension of said flexible conveyor rail thereby limiting a degree of bent of said flexible conveyor rail when mounted on a transfer system.

23. A flexible conveyor rail as defined in claim 18, wherein a distance between a front surface and a back surface of two adjacent rail pieces and/or two adjacent stopper pieces is arranged to limit a degree of bent in said flexible conveyor rail by contacting the front surface and the back surface with each other.

24. A flexible conveyor rail as defined in claim 18, wherein a front surface and a back surface of each of said rail pieces and/or each of said stopper pieces is perpendicular to the longitudinal direction of said flexible conveyor rail.

25. A flexible conveyor rail as defined in claim 18, wherein a front surface and a back surface of each of said rail pieces and/or each of said stopper pieces is inclined either backwardly or forwardly relative to a vertical line which is perpendicular to the longitudinal direction of said flexible conveyor rail.

26. A flexible conveyor rail as defined in claim 18, wherein each of said rail pieces has an I-shape in cross section and is comprised of an upper flange and a lower flange wherein said lower flange functions as a guide flange for rollers of hangers running thereon and said upper flange functions as a base for receiving said link chain thereon.

27. A flexible conveyor rail as defined in claim 18, wherein each of said rail pieces has an I-shape in cross section and is comprised of an upper flange and a lower flange wherein said lower flange functions as a guide flange for rollers of hangers running thereon and said upper flange functions as a base on which a base plate is connected for receiving said link chain thereon.

28. A flexible conveyor rail as defined in claim 26, wherein a gap formed between front and rear surfaces of one side of said lower flange of two adjacent rail pieces is shifted in a longitudinal position from a gap formed between front and rear surfaces of the other side of said lower flange of two adjacent rail pieces.

29. A flexible conveyor rail as defined in claim 26, wherein said guide flange formed at one side of said lower flange is offset in the longitudinal direction relative to an end surface of said rail piece at one end while there is a cut out at the other end.

30. A flexible conveyor rail as defined in claim 18, wherein each of said rail pieces or each of said stopper pieces is shorter than a distance between two link shafts connecting the link plates of said link chain.

31. A flexible conveyor rail as defined in claim 18, wherein each of said stopper pieces has an inverted U-shape in cross section.

32. A flexible conveyor rail as defined in claim 18, wherein each of said rail pieces has an inverted U-shape in cross section and includes at least a lip portion which functions as a guide flange for rollers of hangers running thereon.

33. A flexible conveyor rail as defined in claim 18, wherein said link plate of said link chain is provided with a bracket at a bottom so as to be connected to said rail piece through said bracket.

34. A flexible conveyor rail as defined in claim 18, wherein said link plate of said link chain is provided with a bracket at a bottom, and said rail piece is provided with a base plate at its top, wherein holes are respectively formed on said stopper piece, bracket and base plate so that said stopper piece, link plate and rail piece are connected by fastening bolts through said holes.

* * * * *